United States Patent
Cerny et al.

(10) Patent No.: US 10,134,102 B2
(45) Date of Patent: Nov. 20, 2018

(54) GRAPHICS PROCESSING HARDWARE FOR USING COMPUTE SHADERS AS FRONT END FOR VERTEX SHADERS

(71) Applicants: Sony Interactive Entertainment Inc., Tokyo OT (JP); Advanced Micro Devices, Inc., Sunnyvale, CA (US)

(72) Inventors: Mark Evan Cerny, Los Angeles, CA (US); David Simpson, Los Angeles, CA (US); Jason Scanlin, Los Angeles, CA (US); Michael Mantor, Orlando, FL (US)

(73) Assignees: SONY INTERACTIVE ENTERTAINMENT INC., Tokyo (JP); ADVANCED MICRO DEVICES, INC., Sunnyvale, CA (US)

( * ) Notice: Subject to any disclaimer, the term of this patent is extended or adjusted under 35 U.S.C. 154(b) by 463 days.

(21) Appl. No.: 14/297,290

(22) Filed: Jun. 5, 2014

(65) Prior Publication Data

US 2014/0362102 A1 Dec. 11, 2014

Related U.S. Application Data

(60) Provisional application No. 61/833,233, filed on Jun. 10, 2013.

(51) Int. Cl.
*G06T 1/20* (2006.01)
*G06T 15/00* (2011.01)
*G06T 1/60* (2006.01)

(52) U.S. Cl.
CPC .......... *G06T 1/20* (2013.01); *G06T 1/60* (2013.01); *G06T 15/005* (2013.01)

(58) Field of Classification Search
CPC ......... G06T 15/005; G06T 1/20; G06T 11/40; G06T 15/04; G06T 15/80; G06T 1/60
See application file for complete search history.

(56) References Cited

U.S. PATENT DOCUMENTS 6,717,577 B1 4/2004 Cheng et al.
7,468,726 B1 12/2008 Wloka et al.
(Continued)

FOREIGN PATENT DOCUMENTS

CN 103020205 A 4/2013
EP 2309460 A1 4/2011
(Continued)

OTHER PUBLICATIONS

Riccio, Christophe, and Sean Lilley. "Introducing the programmable vertex pulling rendering pipeline." GPU Pro 4: Advanced Rendering Techniques 4 (Apr. 26, 2013): 21.*
(Continued)

*Primary Examiner* — Gregory J Tryder
*Assistant Examiner* — Scott E Sonners
(74) *Attorney, Agent, or Firm* — JDI Patent; Joshua Isenberg; Robert Pullman

(57) ABSTRACT

A GPU is configured to read and process data produced by a compute shader via the one or more ring buffers and pass the resulting processed data to a vertex shader as input. The GPU is further configured to allow the compute shader and vertex shader to write through a cache. Each ring buffer is configured to synchronize the compute shader and the vertex shader to prevent processed data generated by the compute shader that is written to a particular ring buffer from being overwritten before the data is accessed by the vertex shader. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

19 Claims, 3 Drawing Sheets

(56) References Cited

U.S. PATENT DOCUMENTS

| | | | |
|---|---|---|---|
| 8,542,247 B1* | 9/2013 | Hakura | G06T 15/005 345/620 |
| 8,760,460 B1 | 6/2014 | Kilgariff et al. | |
| 2002/0196251 A1 | 12/2002 | Duluk et al. | |
| 2005/0122338 A1 | 6/2005 | Hong et al. | |
| 2006/0173610 A1 | 8/2006 | Listle | |
| 2007/0171219 A1 | 7/2007 | Tsao | |
| 2008/0204451 A1 | 8/2008 | Im et al. | |
| 2009/0182948 A1 | 7/2009 | Jiao et al. | |
| 2010/0302246 A1 | 12/2010 | Jiao et al. | |
| 2011/0063311 A1* | 3/2011 | McCrary | G06F 9/461 345/522 |
| 2011/0102448 A1 | 5/2011 | Hakura et al. | |
| 2011/0216069 A1 | 9/2011 | Keall et al. | |
| 2011/0242117 A1 | 10/2011 | Bolz et al. | |
| 2012/0223947 A1 | 9/2012 | Nystad et al. | |
| 2013/0113790 A1 | 5/2013 | Kazakov | |
| 2013/0194286 A1* | 8/2013 | Bourd | G06F 9/544 345/545 |

FOREIGN PATENT DOCUMENTS

| | | | |
|---|---|---|---|
| JP | 2001195603 A | 7/2001 | |
| JP | 2010535393 A | 11/2010 | |
| JP | 2012185821 A | 9/2012 | |

OTHER PUBLICATIONS

Final Office Action for U.S. Appl. No. 14/297,248, dated Mar. 11, 2016.

International Search Report and Written Opinion for International Application No. PCT/2014/041386, dated Oct. 9, 2014.

International Search Report and Written Opinion for International Application No. PCT/US2014/041382, dated Oct. 9, 2014.

International Search Report and Written Opinion for International Application No. PCT/US2014/041390, dated Oct. 9, 2014.

U.S. Appl. No. 14/297,201, to Mark Evan Cerny, filed Jun. 5, 2014.

U.S. Appl. No. 14/297,231, to Mark Evan Cerny, filed Jun. 5, 2014.

U.S. Appl. No. 14/297,248, to Mark Evan Cerny, filed Jun. 5, 2014.

U.S. Appl. No. 61/833,213, to Mark Cerny, filed Jun. 10, 2013.

U.S. Appl. No. 61/833,218, to Mark Cerny, filed Jun. 10, 2013.

U.S. Appl. No. 61/833,229, to Mark Cerny, filed Jun. 10, 2013.

U.S. Appl. No. 61/833,233, to Mark Cerny, filed Jun. 10, 2013.

Non-Final Office Action for U.S. Appl. No. 14/297,248, dated Nov. 6, 2015.

"Automatic Pre-Tessellation Culling", Hasselgren, Jon, Munkberg, Jacob, and Ankenine-Moller, Tomas. Apr. 2009. ACM Transactions on Graphics, vol. 28, No. 2, Article 19.

"OpenGL 4.3 Overview, SIGGRAPH 2012", Sep. 16, 2012, available at: I w I https://www.khronos.org/assets/uploads/developers/library/2OI2-siggraph-opengl-bof/OpenGL-4.3-Overview-SIGGRAPH-AugI2.pdf (pp. 1-36) (last visited: Aug. 26, 2016).

"Stack Overflow: DirectX11: Pass Data from Compute Shader to Vertex Shader", Nov. 2, 2010, available at: http://stackoverflow.com/questions/4049787/directxll -pass-data-from-computeshader-to-vertexshader (last visited: Aug. 29, 2016).

"Tutorial—Compute Shader Filters", Aug. 6, 2012, available at: http://www.codinglabs.net/tutorial~compute~shaders~filters.as(pp. 1-11) (last visited: Aug. 29, 2016).

Non-Final Office Action for U.S. Appl. No. 14/297,201, dated Jul. 6, 2016.

Non-Final Office Action for U.S. Appl. No. 14/297,231, dated Jun. 27, 2016.

Non-Final Office Action for U.S. Appl. No. 14/297,248, dated Sep. 8, 2016.

EP Search Report for EP Application No. 14811318.6, dated Jan. 24, 2017.

Final Office Action for U.S. Appl. No. 14/297,201, dated Jan. 27, 2017.

Final Office Action for U.S. Appl. No. 14/297,231, dated Jan. 3, 2017.

Final Office Action for U.S. Appl. No. 14/297,248, dated Jan. 20, 2017.

Glakowsky, P. Nvidia's Fermi: The First Complete GPU Architecture. Sep. 2009. pp. 1-26.

Haines, E and Moller T. Occlusion Culling Algorithms. Nov. 9, 1999. Gamasutra.com. pp. 1-4.

Final Office Action for U.S. Appl. No. 14/297,248, dated Jun. 1, 2017.

International Search Report and Written Opinion for International Application No. PCT/US2014041386, dated Dec. 8, 2016.

Japanese Office Action for Japanese Application No. 2016-518048, dated Oct. 3, 2017.

* cited by examiner

GRAPHICS PROCESSING HARDWARE FOR USING COMPUTE SHADERS AS FRONT END FOR VERTEX SHADERS

CLAIM OF PRIORITY

This application claims the priority benefit of commonly-assigned U.S. provisional patent application No. 61/833,233 filed Jun. 10, 2013, the entire disclosures of which are incorporated herein by reference.

FIELD OF THE DISCLOSURE

Aspects of the present disclosure are related to computer graphics. In particular, the present disclosure is related to use of compute shaders and vertex shaders in a graphics processing unit.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These draw commands may be coordinated by the CPU with a graphics application interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

A GPU may perform these rendering tasks of the graphics pipeline by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The pipeline may also include other shaders at various stages in the pipeline, such as geometry shaders that use the output of the vertex shaders to generate a new set of primitives (or corresponding primitive information), as well as compute shaders (CS) which may implemented by a GPU to perform certain other general computational tasks.

One challenge associated with processing graphics in the pipeline is that certain bottlenecks may occur and slow down performance as data is input and output to the various shaders in the pipeline. Moreover, it is desirable to provide a developer of a particular application running the visuals with a large amount of control over how shaders utilize various visual parameters and underlying data in order to permit them to optimize of the rendering processes.

It is within this context that the present disclosure arises.

SUMMARY

According to certain aspects of the present disclosure, a graphics processing system may include a graphics processing unit (GPU), a cache implemented on the GPU, one or more ring buffers implemented by the GPU, a compute shader configured to run on the GPU and a vertex shader configured to run on the GPU. The GPU is configured to read and process data produced by the compute shader via the one or more ring buffers and pass the resulting processed data to the vertex shader as input. The GPU is further configured to allow the one or more compute shaders and the one or more vertex shaders to read and write through the cache. The one or more ring buffers are configured to synchronize the compute shader and the vertex shader to prevent processed data generated by the compute shader that is written to a particular ring buffer of the one or more ring buffers from being overwritten in the particular ring buffer before the processed data is accessed by the vertex shader.

In some implementations, the one or more ring buffers include an index ring buffer and the data includes one or more indices for one or more vertices of one or more polygons.

In some implementations the compute shader is configured to perform culling to determine whether one or more of the one or more vertices require processing by the vertex shader. Processed data generated by the compute shader may include a culled index table identifying a subset of the one or more vertices that require further processing by the vertex shader.

Some implementations further include a command processor wherein the compute shader is configured to send a notification to the command processor that there is processed data in the ring buffer for the vertex shader and wherein the command processor is configured to convert the notification to commands for GPU hardware to read the processed data.

The vertex shader may be configured to notify the command processor that the vertex shader is done with data from the ring buffer when the vertex shader is done with the processed data from the ring buffer.

The command processor may be configured to pass index data to data reading hardware to generate vertex wavefronts.

The command processor may be configured to implement instructions to test an amount of space available in a particular ring buffer of the one or more ring buffers, wherein the command processor allocates space in the particular ring buffer when there is sufficient space in the particular ring buffer for particular processed data generated by the compute shader, and wherein the command processor is configured to stall until sufficient space is available in the particular ring buffer for the particular processed data.

In some implementations the system may include hardware features that allow the compute shader to perform an ordered allocation before writing the processed data on the one or more ring buffers and allow the vertex shader to perform an ordered de-allocation on the one or more ring buffers.

In some implementations, the system may further comprise a global data share implemented on the GPU that is accessible by the compute shader and the vertex shader.

The global data share may be configured to implement an atomic counter that the compute shader and command processor use to implement one or more notifications from the compute shader that particular processed data is ready for the vertex shader in the one or more ring buffers.

The global data share may alternatively be configured to implement an atomic counter that the vertex shader uses to notify the compute shader that the vertex shader is done with particular processed data in the one or more ring buffers.

In some implementations, the one or more ring buffers may include a vertex ring buffer and the data includes location data for one or more vertices of one or more polygons.

According to other aspects of the present disclosure, a graphics processing method may involve miming a compute shader running on a graphics processor unit (GPU) configured to write data to one or more ring buffers through a cache implemented on the GPU; and running a vertex shader on the GPU configured to access the data written to the one or more ring buffers by reading the data through the cache. The compute shader and the vertex shader are synchronized to prevent processed data generated by the compute shader that is written to the ring buffer from being overwritten in the one or more ring buffers before the processed data is accessed by the vertex shader.

In some implementations of these other aspects the ring buffer may be an index ring buffer and the data includes one or more indices for one or more vertices of one or more polygons.

In some implementations of these other aspects the compute shader may perform culling to determine whether one or more of the one or more vertices require processing by the vertex shader, wherein the processed data includes a culled index table identifying a subset of the one or more vertices that require further processing by the vertex shader.

Some implementations of these other aspects may further comprise sending a notification to a command processor on the GPU that there is data in the ring buffer for the vertex shader and converting the notification to commands for GPU hardware to read the processed data with the command processor.

Synchronizing the compute shader and the vertex shader may include notifying the command processor with the vertex shader that the vertex shader is done with processed data from the ring buffer when the vertex shader is done with the processed data from the ring buffer.

Synchronizing the compute shader and the vertex shader may further include passing index data with the command processor to data reading hardware in the GPU to generate vertex wavefronts.

In some implementations of these other aspects synchronizing the compute shader and the vertex shader may include performing and ordered allocation before writing the processed data to the ring buffer with the compute shader and performing an ordered de-allocation on the one or more ring buffers with the vertex shader.

In some implementations of these other aspects the one or more ring buffers include a vertex ring buffer and the data includes location data for one or more vertices of one or more polygons.

In some implementations of these other aspects synchronizing the compute shader and the vertex shader may include using a global data share implemented on the GPU that is accessible by the compute shader and the vertex shader. The global data share is configured to implement an atomic counter that the compute shader and command processor use to implement the notification or to notify the compute shader that the vertex shader is done with particular processed data in the one or more ring buffers.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1:
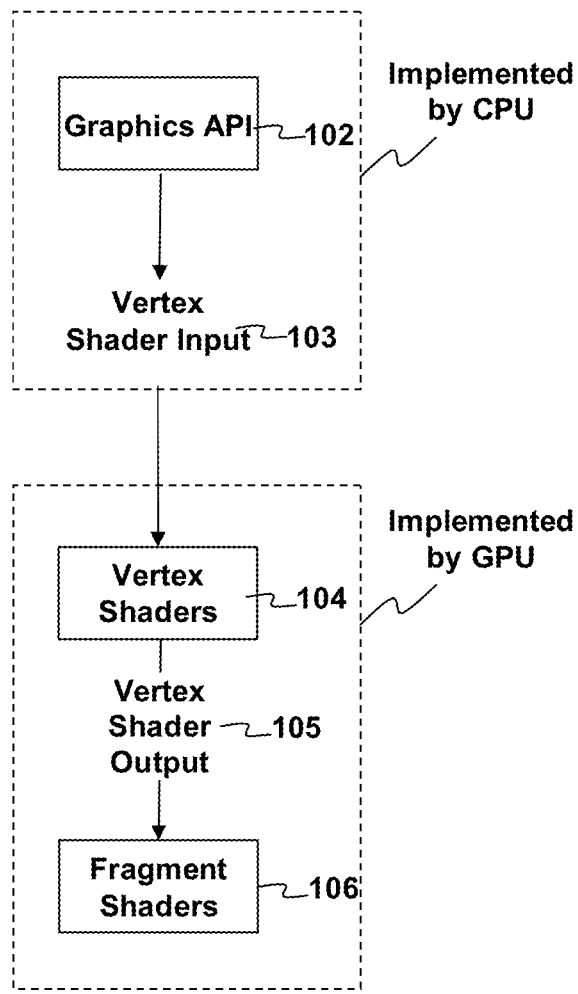
FIG. 1 is a block diagram of conventional graphics processing implementation.

As seen in FIG. 1, conventional graphics processing is typically implemented by a system 100 having a CPU and a GPU. The CPU typically implements a graphics application program interface (API) 102 that produces shader input for the GPU. In general the CPU may obtain data regarding vertices that make up an object to be rendered by the GPU and perform some processing on the data before it is rendered. Such processing may include culling an index table. This type of operation involves analyzing the set of polygons (e.g., triangles) that make up the object to determine whether any of the polygons do not need to be rendered. Each polygon in the set may be identified by an index that identifies polygon. Each polygon may be further characterized by a set of vertices, each of which may have a corresponding index as well as a set of coordinates (e.g., x, y, z, w) coordinates. A vertex is a data structure that describes a point in 2D or 3D space. Display objects are composed of arrays of flat surfaces (e.g., triangles) and vertices define the location and other attributes of the corners of the surfaces. Vertices may be associated not only with position but also with other graphical attributes used to render the object correctly. Such attributes may include, but are not limited to color at the vertex point, reflectance of the surface at the vertex, textures of the surface at the vertex, and the normal of an approximated curved surface at the location of the vertex. The normal can be used to determine a surface's orientation toward a light source for flat shading using Lambert's cosine law, or the orientation of each of the vertices to mimic a curved surface with Phong shading. A vertex shader 104 may use these properties in performing vertex shading. The vertex shader 104 typically transforms each vertex's 3D position in virtual space to the 2D coordinate at which it appears on the screen (as well as a depth value for a Z-buffer).

The graphics API may generate an index table for the object may store the indices for the polygons that make up the object. By way of example, the culling operation implemented by the graphics API may determine whether any of the polygons are backfaced (i.e., not visible in the final image), contain no pixels, or are viewed on edge and therefore have zero area. The indices for such polygons may be removed from the index table to produce a culled index table that is sent to the GPU for further processing. In particular, a vertex shader 104 running in the GPU can convert the coordinates for each of the polygons in the culled index table from 3D global coordinates to 2D local coordinates for rendering on a display. The resulting vertex shader output 105 can then be sent to a fragment shader 106 that fills in the resulting polygons with pixels. Vertex shaders are typically run once for each vertex given to the GPU. The GPU hardware typically can implement a limited number of instances of vertex shaders.

Culling the index table with the CPU works well where the CPU hardware is relatively powerful compared to the GPU in terms of processing capabilities. However, as GPU hardware becomes more capable, it would be desirable to perform tasks like index culling on the GPU. Modern GPUs can implement highly parallel processing and it would be advantageous to utilize this capability to reduce bottlenecks in the graphics pipeline.

System

According to Aspects of the present disclosure graphics processing hardware may be modified to implement certain parts of the graphics pipeline traditionally performed by the CPU using a compute shader running on the GPU.

A compute shader is a shader stage that can be run on the GPU to perform arbitrary computations. Although compute shaders could do rendering, they are generally used for tasks not directly related to drawing polygons and pixels. Compute shaders operate differently from other shader stages in that all of the other shader stages (e.g., vertex shaders and pixel shaders) have well-defined sets of input and output values, which may be built-in or user-defined. The frequency at which a shader stage executes is specified by the nature of that stage; vertex shaders execute once per input vertex, for example (though some executions can be skipped via caching). Fragment (or pixel) shader execution is defined by the fragments generated from the rasterization process.

Compute shaders, by contrast operate on a data "space" that is largely abstract. Each compute shader decides what the space means. The number of compute shader executions is defined by the function used to execute the compute operation. As a result, the number of compute shader instances that can be run at one time is almost unlimited. Most important of all, compute shaders have no user-defined inputs and no outputs at all. The built-in inputs only define where in the "space" of execution a particular compute shader invocation is.

Therefore, if a compute shader wants to take some values as input, it is up to the shader itself to fetch that data, via texture access, arbitrary image load, shader storage blocks, or other forms of interface. Similarly, if a compute shader is to actually compute anything, it must explicitly write to an image or shader storage block.

Because of these properties, a compute shader may be used to implement tasks such as index culling on the GPU that were formerly performed on the CPU. According to aspects of the present disclosure this may be implemented as shown in FIG. 2.

Figure 2:
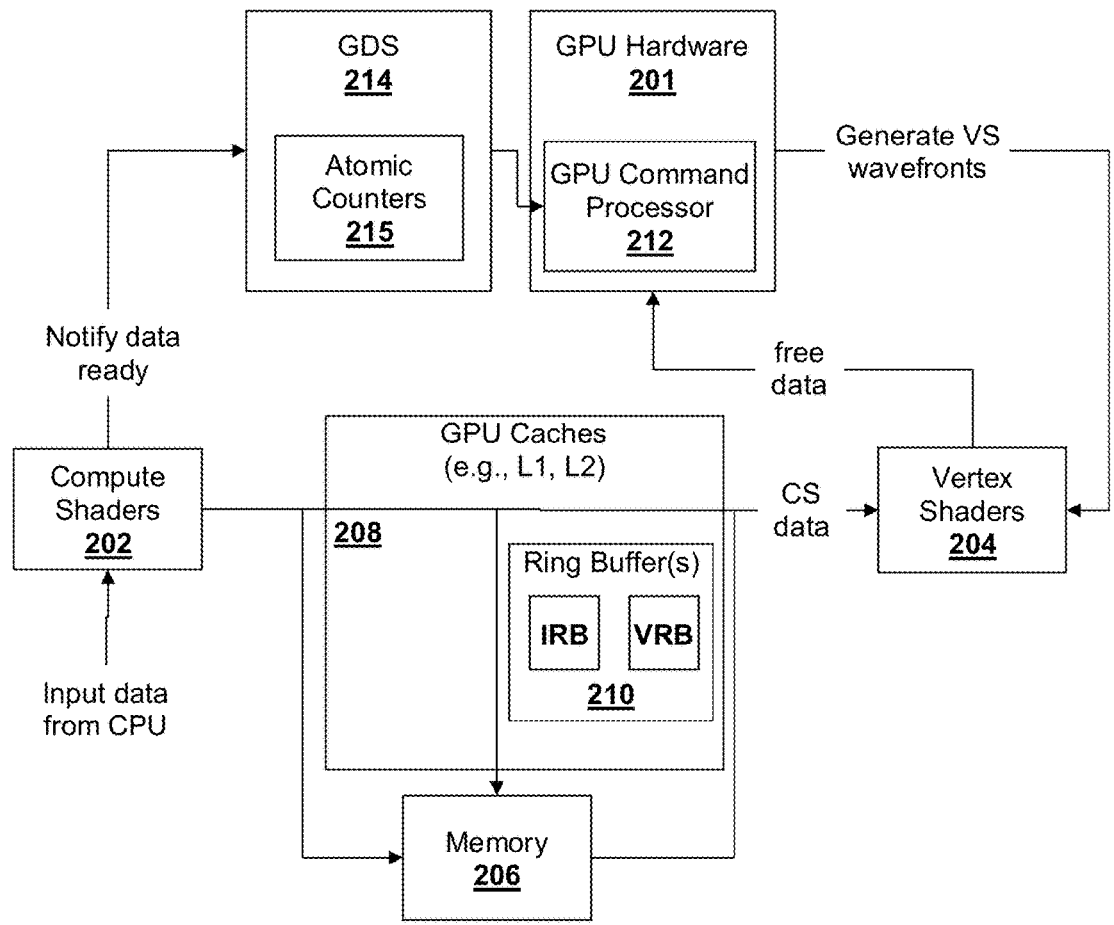
FIG. 2 is a block diagram of a portion of a graphics processing system in accordance with aspects of the present disclosure.

In FIG. 2, a GPU 200 may be configured to facilitate passing data from one or more compute shaders 202 running on the GPU to one or more vertex shaders 204 miming on the GPU. The GPU 200 includes index reading and processing hardware 201 that is responsible for generating instances of vertex shaders 204. The compute shader 202 may operate on input data received from a source outside the GPU, e.g., from a CPU (not shown). Normally the compute shader 202 would write processed data to a table in memory 206 and much later, the GPU hardware 201 would read the processed data from the memory 206. In typical GPU hardware, the compute shader writes the data through a cache 208 to memory. It is noted that the memory 206 may be part of the GPU 200 or may be a separate component of a larger system of which the GPU is a part. The cache 208 may be a dedicated component of the GPU 200 (sometimes called a GPU cache) and may include multiple levels of cache including a level 1 ( L1) cache and a level 2 (L2) cache. According to aspects of the present disclosure, the GPU hardware 201 launches a vertex shader 204 once all of the data it needs is already available in one of the ring buffers 210.

Data can be read from the cache faster than from the memory. Unfortunately, in many GPU hardware implementations, the data falls out of the cache 208 and the vertex shader 204 has to read it from memory. The hardware that brings in index data is direct memory access (DMA) hardware, which means that the vertex shader cannot read the data through the GPU cache at all. Instead the vertex shader pulls in the data straight from the memory 206. This hardware constraint places memory access limitations on the GPU 200 that would tend to obviate any advantage of using the compute shader 202.

According to aspects of the present disclosure, the hardware of GPU hardware 201 may be configured to allow data to be passed to the vertex shader through the cache instead of having to draw it out from the memory 206. The principle behind the hardware modifications is to be able to write data through the GPU cache with the compute shader 202 and then allow the vertex shader 204 to bring in the index data through the GPU cache 208. If the coupling between the compute shader 202 and the vertex data 204 is tight enough the data need not even be written to the memory 206.

In particular, the hardware of the GPU 200 may be configured to implement a data structure known as a ring buffer 210. The contents of the ring buffer 210 contents reside in memory, ideally staying resident in the GPU cache 208. This type of buffer uses a single fixed sized buffer that is configured as if it were connected end to end. When the buffer is full and new data is to be added to the buffer existing data is overwritten. However, if the ring buffer is large enough and the operations of the compute shader and vertex shader are sufficiently synchronized the vertex shader can access data written by the compute shader before it is overwritten. The ring buffer 210 reuses the same piece of memory and stores the index data only for as long as it is needed. As soon as the data in the ring buffer 210 is passed to the vertex shader 204 that data can be written over.

It is noted that there may be more than one ring buffer depending on the type of data to be buffered. For example, index data may be buffered in an index ring buffer IRB and vertex data may be buffered in a separate detected vertex ring buffer VRB. The ring buffers 210 may be mapped to the memory 206. The compute shader 202 may write index data through the cache 208 into the index ring buffer IRB and write vertex data through the cache 208 into the vertex ring buffer VRB. Since it may be implemented in software, the vertex ring buffer VRB is a direct producer-consumer stream of arbitrary data from the compute shader 202 to the vertex shader 204. The format of output to the index ring buffer IRB is stricter, by comparison, because the consumer of the index data is the GPU hardware 201.

Index data may be read by the GPU 200, processed using the compute shader 202, and then passed to vertex shader 204 as inputs. The GPU 200 includes hardware that implements reading of data written to the ring buffer by the compute shader 204. The GPU 200 includes hardware (e.g., index reading hardware) that is configured to support reading through the cache 208. Secondary data (e.g., vertex data) may also be passed through ring buffers 210 to be read directly by the vertex shaders 204, but vertex shaders (and all other shaders) normally read data through the cache and so do not need to be reconfigured to do so.

Although the present discussion relates to index data and vertex data, the ring buffers 210 may be used for other types of data as well. By way of example, and not by way of limitation, such other types of data may include constant control data (shared by all vertices launched in a group) or compressed data that needs indirection or processing to get a value for any one vertex, for instance. Other types of data may include data for a small texture for the vertex shader 204 to read in.

As used herein, the term vertex data generally refers to data that has an element per vertex that can be accessed directly as a vertex buffer.

Although the ring buffers 210 are mapped to memory writes to the ring buffers initially sit in the cache 208. If the vertex shader 204 can read the data as it is going into the GPU cache 208 and before its overwritten and before other processes that are running on the GPU 204 flush it out because they need space in the cache then the data will go into the ring buffer 210 from the compute shader 202 and out of the ring buffer 210 to the vertex shader 204. Many cycles of such writing and reading of data through the ring buffer 210 can take place without the data ever being written to the memory 206. Only after the system is run will the small amount of data in the ring buffer 210 be evicted into memory 206. Therefore the only memory bandwidth need for the data that is passed from the compute shader 202 to the vertex shader 204 is the size of the relevant ring buffer 210. By way of example, and not by way of limitation, the size of the index ring buffer IRB can be much smaller than the total size of index data that is being passed from the compute shader 202 to the vertex shader 204. For example, the total amount of index data in a culled index table may be about 1 MB but the size of the index ring buffer IRB may be only 48 KB. The GPU 200 therefore only needs 48 KB of memory bandwidth to implement the culling with the compute shader 202. If, by contrast the compute shader 202 runs a long time ahead of running the vertex shader 204 1 MB of space would be required to hold all 1 MB of indices until the vertex shader 204 runs the graphics tasks that use the indices. By using a tightly coupled system with a ring buffer 210 the memory footprint for the index data can be greatly reduced.

In order to tightly couple the operations of the compute shader 202 and vertex shader 204 the GPU 200 must support reading data (e.g., index data or vertex data) through the cache. The hardware of the GPU 200 should also be configured to synchronize access to the index ring buffer 210. Such synchronization involves making sure that data is not flushed or overwritten before the vertex processor 204 has used it. The speed of the synchronization determines the size of the ring buffer 210 that is needed. In general faster synchronization results in a smaller required ring buffer size. Furthermore, if the synchronization requires too much overhead bottlenecks may be introduced into the GPU. To implement the synchronization, the hardware of the GPU 200 may be configured to control access to the ring buffers 210 prevent data from being discarded from a ring buffer before it is needed by the vertex shader 204. Specifically, hardware should allow the vertex shader 202 to notify the GPU 200 that the vertex shader is done using particular data in the ring buffer. In addition, the hardware of the GPU 200 can be configured to receive a notification from the compute shader 202 indicating that there is particular data ready for the vertex shader 204 in the ring buffer 210 and to convert that notification to commands to generate vertex wavefronts using the particular data. As used herein the term "vertex wavefront" refers to an instance of a vertex shader.

The hardware of the GPU 200 may be configured to enable use of a ring buffer instead of a flat buffer, which is more commonly the case. In order to implement a ring buffer efficiently it is important for the allocation and de-allocation to come in order. The GPU 200 may include hardware and firmware that is configured to manage allocation and de-allocation of ring buffers 210. By way of example, and not by way of limitation the GPU hardware 201 may be configured to allow global ordered writes of vertex wavefronts to ring buffers 210, e.g., the index ring buffer IRB or vertex ring buffer VRB. In particular the GPU hardware 201 may be configured so that the compute shaders 202 can perform ordered allocations before writing to the ring buffer 210. In addition, the GPU hardware 201 may be configured so that the vertex shaders 204 can perform ordered de-allocations after receiving processed data from the ring buffer 210.

The GPU 200 may include a GPU command processor 212 and a global data share (GDS) 214 that are configured to implement the synchronization between the compute shader 202 and vertex shader 204. The GPU command processor 202 may be configured to pass data from the ring buffers 210 to data reading hardware in the GPU 200 to generate the vertex wavefronts. To prevent unused data in the ring buffer from being overwritten, the allocation and de-allocation of space in the ring buffer requires ordering. The GPU command processor 212 and global data share 214 can be configured to do the allocation and de-allocation through the use of ordered allocations and de-allocations to atomic counters 215 in the GDS 214. This allows the synchronization to be implemented with low overhead.

The GDS 214 is a fast piece of on-chip memory that is configured for synchronizing access to global buffers. The GDS 214 is configured to be visible to all shaders including compute shaders and vertex shaders. The compute shader 202 can be configured to perform a notification that data is ready in the ring buffer 210 by writing to a GDS atomic counter 215 to indicate that data has been written. The command processor 212 is notified of these writes to the GDS 214 and causes the GPU to generate vertex wavefronts. Once the vertex data is ready, the vertex shader 204 can send a notification to free the data via the atomic counter 215.

The GDS 214 can hold counters indicating the current state of the ring buffers 210. The GDS 214 may be used to implement a so-called "Kick Ring Buffer" to implement a first-in-first-out (FIFO) data structure to hold state for each draw command which is in progress. Allocations can be managed by the command processor 212 and state can be updated by compute shaders 204 to notify the command processor 212 when they have written processed data to the ring buffers 210. By comparison, the ring buffers 210 implement producer-consumer streams with allocations made by the producer (e.g., the compute shader 202) and de-allocations issued by the consumer (e.g., vertex shader 204).

The command processor 212 may include firmware that allows the command processor to read buffer that contains commands to the GPU. The command processor 212 may be thought of as implementing a first level of processing of user input. Such hardware and firmware may be configured to manage allocation and de-allocation of ring buffers 210 and allows an input assembly unit to read from a level 2 (L2) cache.

The command processor 212 may be configured to implement instructions that preserve the ordering of the wavefronts. In particular, the command processor 212 may be configured to implement instructions to test the space available in the ring buffer 210. If there is enough space for the data to be written by the compute shader 202 the command processor can allocate it. If not, the command processor can stall until the space is available.

There are a number of ways in which the GPU 200 may be used. For example, the compute shader 202 may be configured to implement polygon culling (e.g., triangle culling), as discussed above. In such a case, the culled index data may be passed through to the vertex shader via the index ring buffer IRB. It is noted that the three-dimensional positions of the vertices are generated as part of the process of polygon culling. Once the positions of the vertices have been computed by the compute shader 202 they can be stored in the vertex ring buffer VRB and passed through to the vertex shader so that the vertex shader does not have to re-compute them.

This may be more complicated for vertex data than for index data since vertex shaders often have parts that run on multiple different pieces of hardware within a GPU. In such implementations, each unit of the GPU that implements part of a vertex shader would have to be synchronized with the compute shader (and with each other) to implement the de-allocation of ring buffer space. In principle, the hardware of the GPU 200 may use atomic counters into order to do the coordination, as discussed above.

As noted above, the GPU 200 can be configured to pass vertex data as well as index data. As such, implementations of aspects of the present disclosure are not limited to those involving generation of culled index tables using a compute shader. Examples of operations that could be implemented with the compute shader 202 include vertex transforms that are closely related to an underlying physics simulation. One such example is known as skinning of vertices, which is a common operation in computer games or video games. In a skinning operation, the locations of the vertices that are passed to the vertex shader are tied in some way to underlying structures sometimes known as "bones". The bones may be thought of as skeletal features that are subject to constraints (e.g., joints). The movements of the bones may be determined through a physics simulation run on a CPU. The vertices are said to be "skinned" to one or more bones through corresponding transform matrices. In general, there may be one local transform matrix per bone. Each vertex may reference some number of bones with a different weight for each reference. To calculate the vertex position, the vertex may be transformed separately according to each affecting bone's transform matrix, and the separate results may then be blended (interpolated) based on the weights to determine the final position of the vertex.

Normally a compute shader would have to perform the skinning work to determine the vertex positions then write up the index data for the corresponding polygons and pass that data to the vertex shader. The vertex shader would then re-do all of the skinning work. However, according to aspects of the present disclosure, the ring buffer 210 may be used to pass the skinned vertex data from the compute shader 202 to the vertex shader 204 without having to have the vertex shader re-do the vertex calculations. The compute shader 202 would just pass the skinned vertex data to the vertex shader via the vertex ring buffer VRB.

Figure 3:
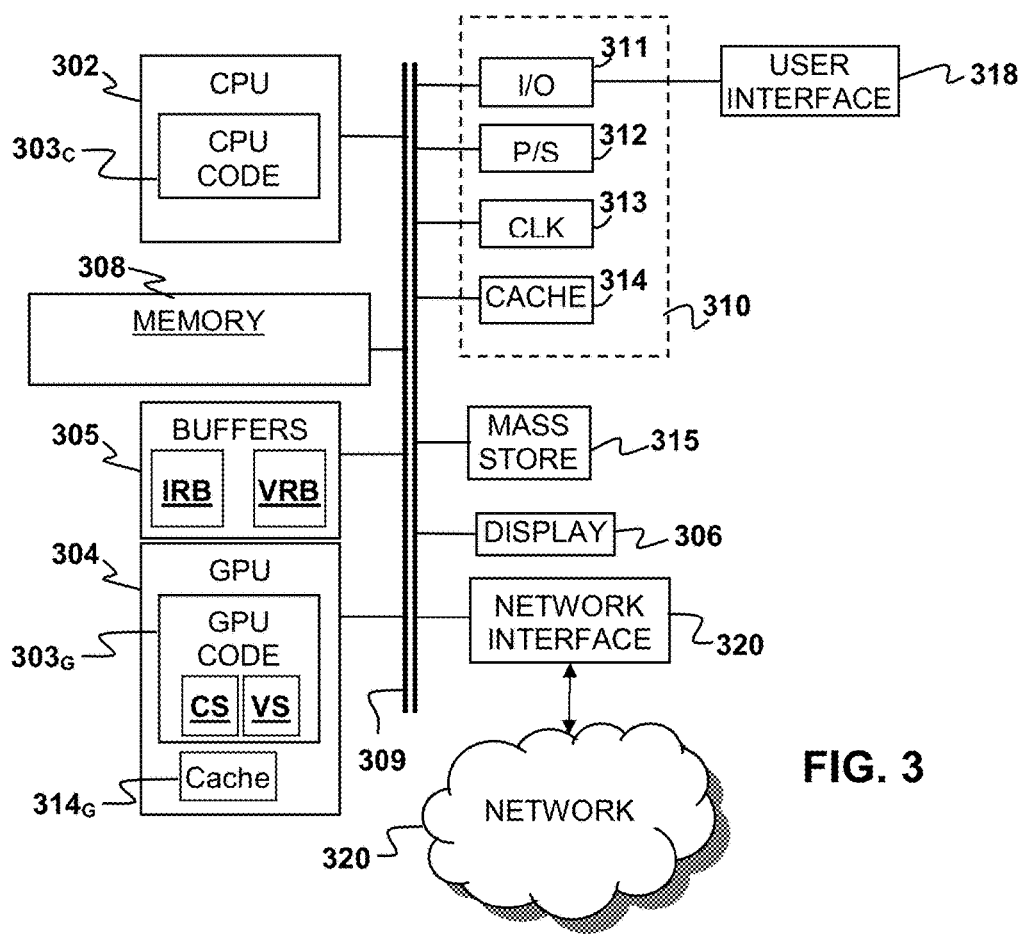
FIG. 3 is a block diagram of a graphics processing system in accordance with aspects of the present disclosure.

Aspects of the present disclosure include graphics processing systems that are configured to implement the features discussed above. By way of example, and not by way of limitation, FIG. 3 illustrates a block diagram of a computer system 300 that may be used to implement graphics processing according to aspects of the present disclosure. According to aspects of the present disclosure, the system 400 may be an embedded system, mobile phone, personal computer, tablet computer, portable game device, workstation, game console, and the like.

The system 300 generally may include a central processor unit (CPU) 302, a graphics processor unit (GPU) 304, and a memory 308 that is accessible to both the CPU and GPU. The CPU 302 and GPU 304 may each include one or more processor cores, e.g., a single core, two cores, four cores, eight cores, or more. The memory 308 may be in the form of an integrated circuit that provides addressable memory, e.g., RAM, DRAM, and the like.

By way of example, and not by way of limitation, the CPU 302 and GPU 304 may access the memory 308 using a data bus 309. In some cases, it may be useful for the system 300 to include two or more different buses. The memory 308 may contain data that can be accessed by the CPU 302 and GPU 304. The GPU 304 may include a plurality of compute units configured to perform graphics processing tasks in parallel. Each compute unit may include its own dedicated local memory store, such as a local data share.

The CPU may be configured to execute CPU code $303_C$, which may include an application that utilizes graphics, a compiler and a graphics API. The graphics API can be configured to issue draw commands to programs implemented by the GPU. The CPU code $303_C$ may also implement physics simulations and other functions. The GPU may be configured to operate as discussed above with respect to FIG. 2. In particular, the GPU may execute GPU code $303_G$, which may implement compute shaders CS and vertex shaders VS, as discussed above. To facilitate passing of data between the compute shaders CS and the vertex shaders VS the system may include one or more ring buffers 305, which may include index ring buffers IRB and vertex ring buffers VRB. The GPU code $303_G$ may also optionally implement other types of shaders (not shown), such as pixel shaders or geometry shaders.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. In addition to the cache 314, the GPU 304 may include its own GPU cache $314_G$, and the GPU may be configured so that programs running on the GPU 304 can read-through or write-though the GPU cache $314_G$ in particular, the system may be configured so that compute shaders running on the GPU can write-through the GPU cache to the memory or buffers and vertex shaders can read through the GPU cache $314_G$ from the memory or buffers.

The apparatus 300 may optionally include a mass storage device 315 such as a disk drive, CD-ROM drive, flash memory, tape drive, or the like to store programs and/or data. The system 300 may also optionally include a display unit 306 and user interface unit 318 to facilitate interaction between the system 300 and a user. The display unit 306 may be in the form of a flat panel display, cathode ray tube (CRT) screen or other device that can display text, numerals, graphical symbols or images. The user interface 318 may include a keyboard, mouse, joystick, light pen, game controller, or other device that may be used in conjunction with a graphical user interface (GUI). The system 300 may also include a network interface 320 to enable the device to communicate with other devices over a network 322. The network 322 may be, e.g., a local area network (LAN), a wide area network such as the internet, a personal area network, such as a Bluetooth network or other type of network. These components may be implemented in hardware, software, or firmware, or some combination of two or more of these.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A graphics processing system, comprising:
a graphics processor unit (GPU);
a cache implemented on the GPU;
one or more ring buffers implemented by the GPU;
a compute shader configured to run on the GPU; and
a vertex shader configured to run on the GPU,
a global data share implemented on the GPU that is accessible by the compute shader and the vertex shader;
wherein the GPU is configured to read and process data produced by the compute shader via the one or more ring buffers and pass the resulting processed data to the vertex shader as input,
wherein the GPU is further configured to allow the one or more compute shaders and the one or more vertex shaders to read and write through the cache, wherein the one or more ring buffers are configured to synchronize the compute shader and the vertex shader to prevent processed data generated by the compute shader that is written to a particular ring buffer of the one or more ring buffers from being overwritten in the particular ring buffer before the data is accessed by the vertex shader, wherein the one or more ring buffers are configured to allow the compute shader to perform ordered allocations on the one or more ring buffers and the vertex shader to perform ordered de-allocations on the one or more ring buffers wherein the compute shader writes to an atomic counter in the global data share to synchronize buffer access.

2. The system of claim 1 wherein the one or more ring buffers include an index ring buffer, wherein the index ring buffer stores one or more indices for one or more vertices of one or more polygons.

3. The system of claim 2, wherein the compute shader is configured to perform culling to determine whether one or more of the one or more vertices require processing by the vertex shader, wherein the processed data includes a culled index table identifying a subset of the one or more vertices that require further processing by the vertex shader, wherein culling removes indices of polygons which have no visible area and the culled index table does not include indices for polygons that have no visible area.

4. The system of claim 1, further comprising a command processor wherein the compute shader is configured to send a notification to the command processor that there is data in the ring buffer for the vertex shader and wherein the command processor is configured to convert the notification to commands for GPU hardware to read the data.

5. The system of claim 4 wherein the vertex shader is configured to notify the command processor that the vertex shader is done with data from the ring buffer when the vertex shader is done with the data from the ring buffer.

6. The system of claim 4, wherein the command processor is configured to pass index data to data reading hardware to generate vertex wavefronts.

7. The system of claim 4, wherein the command processor is configured to implement instructions to test an amount of space available in a particular ring buffer of the one or more ring buffers, wherein the command processor allocates space in the particular ring buffer when there is sufficient space in the particular ring buffer for particular processed data generated by the compute shader, and wherein the command processor is configured to stall until sufficient space is available in the particular ring buffer.

8. The system of claim 1, wherein the global data share is configured to implement the atomic counter that the compute shader and command processor use to implement one or more notifications from the compute shader that particular processed data is ready for the vertex shader in the one or more ring buffers.

9. The system of claim 1, wherein the global data share is configured to implement an atomic counter that the vertex shader uses to notify the compute shader that the vertex shader is done with particular processed data in the one or more ring buffers.

10. The system of claim 1 wherein the one or more ring buffers include a vertex ring buffer and the data includes location data for one or more vertices of one or more polygons.

11. The system of claim, 1, wherein the system is an embedded system, mobile phone, personal computer, tablet computer, portable game device, workstation, or game console.

12. A graphics processing method, comprising:
running a compute shader running on a graphics processor unit (GPU) configured to write to an image or shader storage block in one or more ring buffers through a cache implemented on the GPU; and
running a vertex shader on the GPU configured to access data in memory written by compute shader by reading the data written by the vertex shader through the cache;
synchronizing the compute shader and the vertex shader to prevent processed data generated by the compute shader that is written to the one or more ring buffers from being overwritten in the one or more ring buffers before the data is accessed by the vertex shader, wherein the one or more ring buffers are configured to allow the compute shader to perform ordered allocations on the one or more ring buffers and the vertex shader to perform ordered de-allocations on the one or more ring buffers wherein the compute shader writes to an atomic counter in a global data share to synchronize buffer access, where the global data share is implemented on the GPU and is accessible by the compute shader and the vertex shader.

13. The method of claim 12 wherein the one or more ring buffers includes an index ring buffer, wherein the index ring buffer stores one or more indices for one or more vertices of one or more polygons.

14. The method of claim 13, wherein the compute shader performs culling to determine whether one or more of the one or more vertices require processing by the vertex shader, wherein the data written by the compute shader includes a culled index table identifying a subset of the one or more vertices that require further processing by the vertex shader.

15. The method of claim 12, further comprising sending a notification to a command processor on the GPU that there is data in the ring buffer for the vertex shader and converting the notification to commands for GPU hardware to read the data with the command processor.

16. The method of claim 15, wherein synchronizing the compute shader and the vertex shader includes notifying the command processor with the vertex shader that the vertex shader is done with data from the ring buffer when the vertex shader is done with the data from the ring buffer.

17. The method of claim 15, further comprising passing index data with the command processor to data reading hardware in the GPU to generate vertex wavefronts.

18. The method of claim 12, wherein the one or more ring buffers include a vertex ring buffer and the data includes location data for one or more vertices of one or more polygons.

19. The method of claim 12, wherein synchronizing the compute shader and the vertex shader includes using a global data share implemented on the GPU that is accessible by the compute shader and the vertex shader to implement an atomic counter that the compute shader and command processor use to implement one or more notifications from the compute shader that particular processed data is ready for the vertex shader in the one or more ring buffers or to notify the compute shader that the vertex shader is done with particular processed data in the one or more ring buffers.

* * * * *